July 16, 1968 A. L. DAVIS 3,392,915
CLIMATIC CONTROLS FOR INTERNAL COMBUSTION ENGINES
Filed April 14, 1966 3 Sheets-Sheet 1
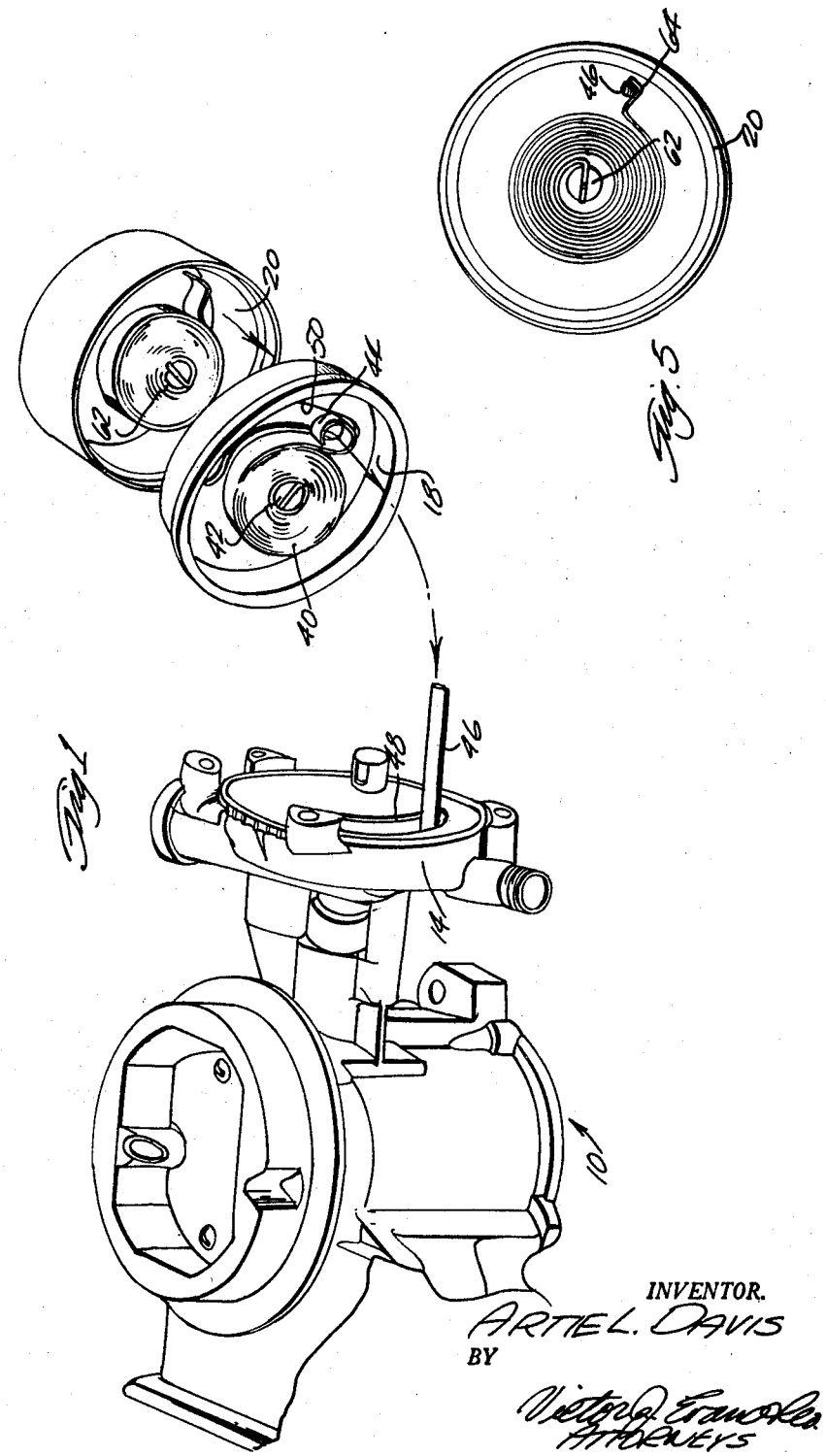
INVENTOR.
ARTIE L. DAVIS
BY

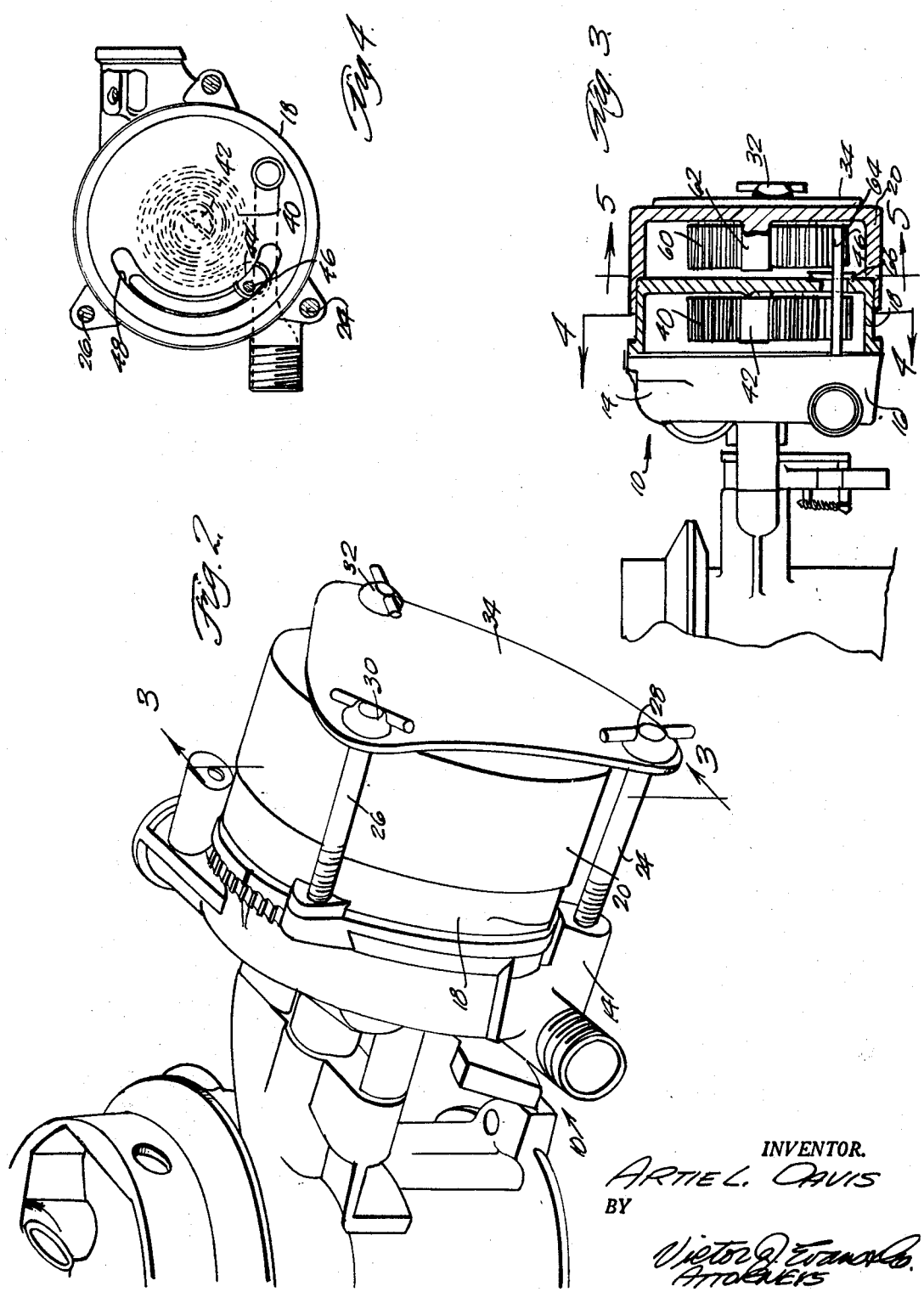

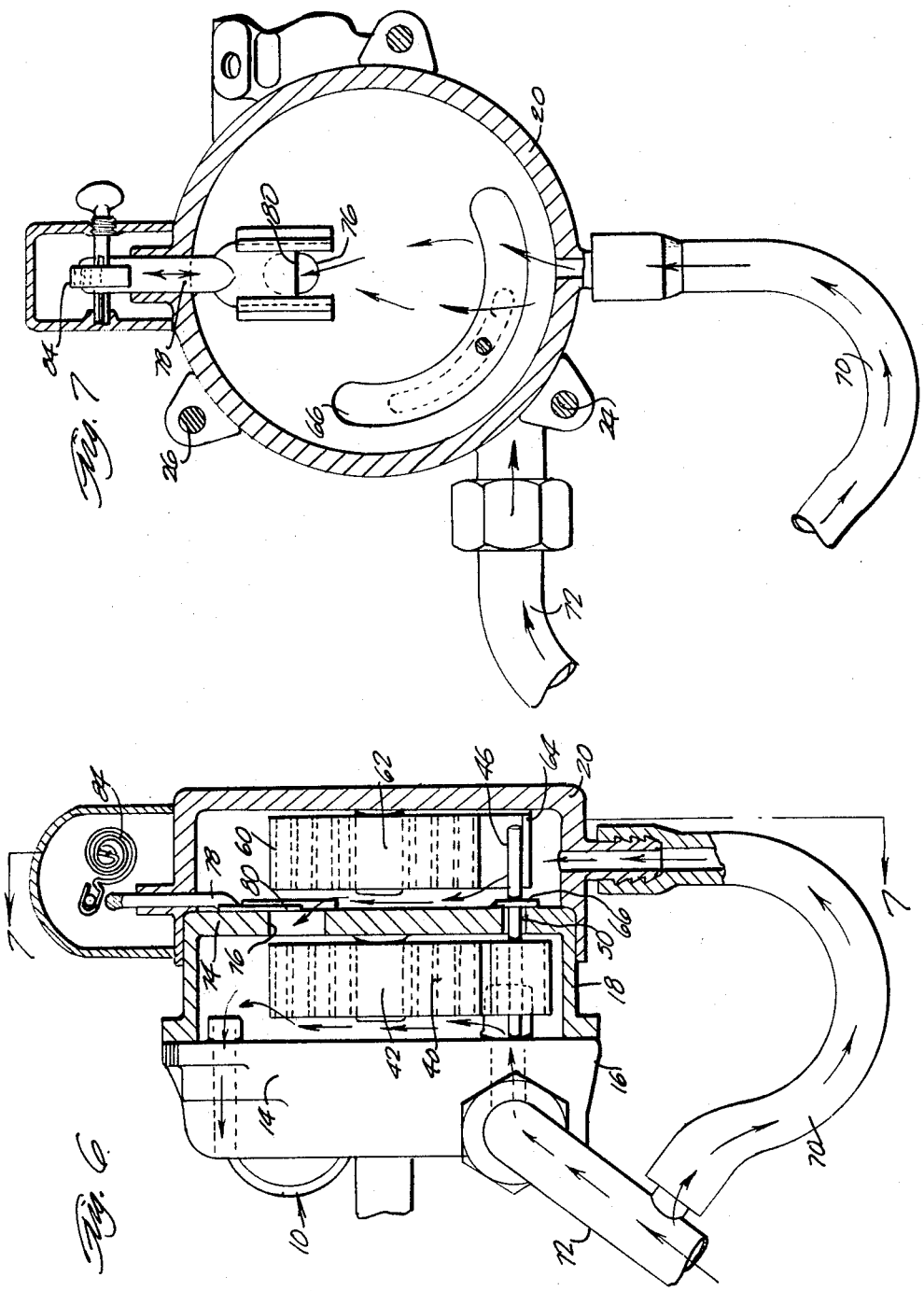

United States Patent Office 3,392,915
Patented July 16, 1968

3,392,915
CLIMATIC CONTROLS FOR INTERNAL
COMBUSTION ENGINES
Artie L. Davis, Rector, Ark., assignor of one-fourth to
J. A. Marlar, Rector, Ark.
Filed Apr. 14, 1966, Ser. No. 542,520
5 Claims. (Cl. 236—101)

ABSTRACT OF THE DISCLOSURE

Climatic controls for internal combustion engines having a secondary or opposing thermostatic coil spring that counterbalances the increased amount of torque of the operating thermostatic coil spring to assist starting in cold weather and yet, when sufficient heat has entered the housing, the coil spring is reversely operated to eliminate any adverse effects.

---

The present invention relates to an improved climatic control on automatic chokes for internal combustion engines, and more particularly the invention relates to providing a secondary or opposing thermostatic coil spring that will counterbalance the increased amount of torque of the operating thermostatic coil spring in any low temperature zones and will allow the operating thermostat to maintain the extension of an eccentrically mounted lever in a position for cold weather starting without lessening the amount of tension exerted by the operating thermostatic coil spring, and yet when sufficient heat, channeled properly, has entered the housing of the opposing spring, which is after the motor has sufficiently warmed up, the secondary or opposing thermostatic coil spring will reverse or relax tension in the same manner that the operating thermostatic coil spring reverses when heated.

It is known in the prior art to provide sets of two thermostatic coil springs in automatic chokes for internal combustion engines, but the prior art teaches only the use of the additional spring thermostat to prevent sticking of the automatic choke, and in which only the added thermostatic spring functions only after the automatic choke valve has opened at least a predetermined amount.

An object, therefore, of the present invention is to provide a secondary or opposing spring element in axial alignment with a first and operating spring element, so that the operating spring element maintains the extension lever eccentrically mounted on the axis thereof in a position for cold weather starting and the opposing spring element will not lessen the amount of tension disposed against the lever by the operating spring element until such time that enough heat has entered the housing for the operating thermostatic spring element to operate, which is after the motor has started to warm up to normal operating conditions.

Another feature and object of the present invention is to provide a shutter that travels with the lever which is eccentrically mounted from the axis of the thermostatic elements and operable thereby, so that the shutter on the lever will regulate the timing of entry and the amount of heated air passing from the housing for the operating thermostat to the other housing for the opposing functioning thermostat.

A further feature and object of the invention is to provide an auxiliary valve or shutter that is thermostatically opened or operated, the shutter disposed in the housing between the two thermostatic springs, wherein one spring is the operating means and the other thermostatic spring is the opposing means, and in which improved automatic starting is accomplished in zero weather conditions and the like.

It is generally common knowledge that the climatic controls on automatic chokes for internal combustion engines in general use today require adjustment for temperature variations in the different weather and temperature zones in which the engine is to be operated.

In the climatic controls of the present invention, it is found possible to go from any one weather zone to another weather zone without any change in setting of the automatic choke being necessary.

A further object of the climatic control for automatic chokes of the present invention is to provide a mechanism to open the choke quickly after the motor is started and upon sufficient heat being generated by the engine, the position of the choke is returned to normal position. Full power of the engine will be had in a much shorter time due to the more rapid opening of the choke as accomplished by the means of the present invention, and it is found that gasoline consumption is greatly improved and reduced, resulting in more miles per gallon in performance of the engines to which the invention is applied. Further, the length of life of the motor to which the invention is applied is increased because of the improved operation of the choke and the elimination of the long period of over-rich choking during the usual warm-up period.

A further object and feature of the invention is to provide a choke assembly attachment that may be made as a factory-adjusted sealed unit, requiring no further adjustment for the life of the unit, and upon damage or fracture of the unit, the unit may be simply and expediently replaced by another.

The above and other objects and advantages of the invention will become apparent upon full consideration of the following detailed description and accompanying drawings, in which:

FIGURE 1 is a generally perspective and partially exploded view of a carburetor showing the automatic choke for internal combustion engines having the improved climatic control mechanism of the present invention;

FIGURE 2 shows the automatic choke having the climatic control mechanism in its assembled position;

FIGURE 3 is a cross-sectional view taken along lines 3—3 of FIGURE 2;

FIGURE 4 is a cross-sectional view taken along lines 4—4 of FIGURE 3;

FIGURE 5 is a cross-sectional view taken along lines 5—5 of FIGURE 3;

FIGURE 6 is a cross-sectional view of an automatic choke showing a modification of the present invention having the climatic control mechanism; and FIGURE 7 shows a cross-sectional view taken along lines 7—7 of FIGURE 6.

Referring now to the drawings there is shown a carburetor 10 of an internal combustion engine having an automatic choke 14, comprised of a base 16, a conventional housing 18 and a supplemental or superimposed housing 20 which is mounted on housing 18. The housings 18, 20 are maintained in a rigid and secure relation by bolts 24, 26, and fastening means 28, 30, 32, as shown in FIGURES 2 and 3, so that a mounting plate 34 retains the housing 18, 20 in place.

Within the housing 18 there is a generally spirally contoured thermostat spring 40, as shown in FIGURE 4, and in which the spring 40 is mounted from the center by support means 42, and in which the peripheral or distal end 44 of the spring 40 is engaged to be secured to an extension pin 46 which operates the valve or control means for the automatic choke. The extension pin 46 extends from the base 16 outwardly as shown in FIGURE 1, among others, and engages with the loop end 44 and extends outwardly through the housing 18 into the housing 20 as shown in FIGURES 3 and 6. The pin 46 extends outwardly through arcuate shaped aperture 48 of the base 16, and there is a similarly contoured arcuate aperture 50 in the central part of the housing 18, and the pin 46 extends through the aperture 50 into the housing 20. Mounted centrally in the housing 20 is a reversely wound helical or spiral thermostatic coil wound thermostatic spring 60 mounted from a central support means 62 and having an outside end connecting means 64 for engaging the free end of the extension pin 46. While one set of the helical or coil wound thermostatic springs 40, 60, is wound in a clockwise direction, the other is wound in a counterclockwise direction, and for purposes of understanding the invention, the thermostatic spring 40 in housing 18 may be identified as the operating thermostat for opening and closing the choke, and the one in housing 20 shown as thermostatic spring 60 is wound oppositely to counterbalance spring 40 and to assist in opening the choke at certain intervals, and may be identified as the opposing thermostat spring 60. Each of the thermostats 40, 60, may be identical, or may be substantially identical in torque power.

To pre-set springs 40, 60, to render them operative, and for the minimum temperature at which the choke should be closed, first fixedly place spring 60 to adequately open the choke. Then rotate spring 40 so that it will overcome the torque of spring 60 and move the choke to a closed position. Thus spring 40 has reversely wound spring 60 and a contraverse action of the torque exists between the two springs. When the motor has started and heat is flowing through housing 18, spring 40 will be heated and will lose some of its torque and start to open the choke, and at this time shutter 66 keeps the heat from radiating from housing 18 into housing 20 and, therefore, spring 60 will offer an overbalanced torque toward opening the choke. When pin 46 has moved a sufficient distance shutter 66 will operate toward opening aperture 50 and will allow heat to be radiated from housing 18 into housing 20. This admission of heat into housing 20 will begin to warm spring 60 and will retard the rapid opening of the choke. So, by using shutters 66 and 80 to carefully adjust the amount and to time the entry of the heat allowed to radiate from housing 18 into housing 20 it will be possible to perfectly regulate the opening of the choke in any range of temperature. When the temperature drops and more torque is exerted by spring 40 on pin 46, an equal amount of torque will be exerted by spring 60 and therefore spring 60 will counterbalance spring 40 in any temperature range in any zone.

The opposing thermostat 60 is fitted onto the housing 18 which contains thermostat 40, and in order to have both thermostats 40, 60 in operative relation, the lever 46 is sufficiently lengthened to extend in cooperative relation with the ends 44, 64 of each of the thermostat springs, so that the opposing thermostat can catch the pin 46 by its end 64.

The housing 18 contains an opening sufficiently large to allow a sufficient amount of heat to enter into the housing of the opposing thermostat 60 so that the opposing thermostat may function properly upon receiving the deferred amount of heat transfer through the opening 50. In order to achieve this, a shutter 66 is fastened to pin 46 on which the operating thermostat and the opposing thermostat fit and connect, and shutter 66 is arranged to fit snugly against the wall between the two thermostats and the shutter 66 is sufficiently large so that it will cover the opening 50 between the two housings. The shutter 66 will time the entry of and control the amount of heat transferred from housing 18 into the opposite or opposing housing 20 having the thermostat 60. The shutter 66 is arranged so that it will begin to open soon after the choke has started to open and this causes a delayed heating of the opposing thermostat until the choke has partially opened and the motor has warmed up to a slight degree.

The heat enters the operating thermostat housing 18 through aperture 48 and by other convection and radiation processes, and the heat is forced across and around the operating thermostat by the vacuum created by the carburetor. This effect causes a rapid heating of the operating thermostat 40 while the opposing thermostat 60 is receiving a delayed heating effected by radiation and convection through the opening 50 which is in the wall separating the thermostats 40, 60. The delayed heating of the opposing thermostat 60 and the rapid heating of the operating thermostat 40 is necessary to allow the two thermostats to function properly and to quickly open the choke in the initial stages of starting the internal combustion engine (not shown).

When shutter 66 has moved sufficiently to allow heat to radiate through opening 50, spring 60 will relax and reverse to an inoperative position and will remain inoperative as long as it receives heat through opening 50, and at the same time heat has been drawn by the vacuum through housing 18 and spring 40 has been heated to cause it to reverse and to open the choke. As long as heat is forced through housing 18 spring 40 will remain heated and therefore will hold the choke in an open position.

Upon the engine being shut down, the net effect of thermostats 40, 60 is to return the choke to a closed position when the engine is cold, and this is achieved upon the thermostats 40, 60 becoming cooled again so that the cycle of operating the choke may again be repeated as described above.

A further embodiment of the present invention is to provide the opposing thermostat element 60 with a supply of circuitous heated air through a conduit 70 as shown in FIGURES 6 and 7 from the direct flow of heated air in conduit 72, and conduit 70 being connected to the housing 20 provides a controlled path of heated air to the thermostat element 60 so that a more accurate performance of governing the opening time of the choke is achieved in near- or sub-zero temperature zones, as is accomplished by port 76. Port 76 allows an added amount of heat to be transferred into the opposing thermostat housing 20 and would delay the opening of the choke automatically until the motor has reached a warmer and predetermined condition. To manipulate the auxilary supply of heat, there is arranged a stem 78 for valve 80 and the port 76 from the outside wall of the opposing thermostat housing so that with the valve head 80 cooperating with the port 76 in response to the stem 78 being thermally actuated by a thermostatic member 84, there is means for circulating the heat through the opposing thermostat housing by inducing a flow of heated air through conduit 70.

When the temperature drops to a point to cause auxiliary thermostat 84 to open valve 80 so that heat is forcefully drawn through housing 20 by the vacuum, spring 60 will be hurriedly heated and will quickly relax some of its torque. This will allow spring 40 to hold the choke partially closed for a longer period to allow a richer mixture for the motor while the motor is still cold. The stem of the valve head 80 extends through the outside wall 20 of the opposing thermostat housing so that the auxiliary thermostat 84 may contact the stem 78 to actuate the valve, comprising valve head 80 and port 76. The stem fits the valve guide 85 as snugly as possible at the thermostat end to minimize the amount of heat escaping into the auxiliary thermostat housing and to provide an absence of lost mechanical motion between the auxiliary thermostat and the valve head 80 so that the auxiliary thermostat may remain as cold as the surrounding environment.

The material for the auxiliary thermostat housing 7 may be such that it is a good conductor of heat and cold temperature, so that the thermostat 84 will remain as cool as possible. The auxiliary thermostat 84 opens valve 80 only when temperature has dropped to a point which necessitates it to function. As long as the temperature stays above this point thermostat 84 will hold valve 80 in a closed position.

Thus it is seen that the valve or shutter means 80 is opened so that the opposing thermostat element is heated in a manner up toward the temperature of the operating thermostat element, upon and solely upon the temperature of the engine generating sufficient heat to achieve this end. There is no doubt that the engine can generate this amount of heat.

Additional embodiments of the invention in this specification will occur to others and therefore it is intended that the scope of the invention be limited only by the appended claims and not by the embodiments described hereinabove. Accordingly, reference should be made to the following claims in determining the full scope of the invention.

What is claimed is:

1. An improved climatic control on automatic chokes for internal combustion engines comprising a set of two coil-wound thermostats positioned about a common axis and one of said sets of thermostats actuating an eccentrically mounted pin parallel with said axis to oppose the other of said sets of thermostats in actuating the lever operating the choke to its open and closed conditions, each of said thermostats having a housing and opening therein to allow entry of sufficient heat therein, and a shutter means affixed to the pin to preclude passage of air from the inner one of said sets of thermostats to the outer one of said sets through an aperture through which the pin commonly communicates to each of the housings.

2. The invention according to claim 1 wherein the housing of the outer one of said sets is a thermally conductive material for maintaining the thermostat therein in a substantially cool condition when the environment thereto is cool.

3. The invention according to claim 2 wherein a delayed passage means of heating air is applied to the outer housing from said engine.

4. The invention according to claim 3 wherein an auxiliary thermostat is provided responsive to the coolness of the environment about said housings, for actuating a valve and port interposed between said sets of thermostats and housings.

5. The invention according to claim 4 wherein said thermostat elements and their attending housings comprise a single compact and replaceable unit.

References Cited

UNITED STATES PATENTS

| | | | |
|---|---|---|---|
| 3,174,687 | 3/1965 | Gilbert | 236—91 |
| 3,278,119 | 10/1966 | Sagady | 236—91 |

EDWARD J. MICHAEL, *Primary Examiner.*